Aug. 2, 1927.
G. D. ANGLE
1,637,979
ARTICULATED CONNECTING ROD
Filed July 19, 1926
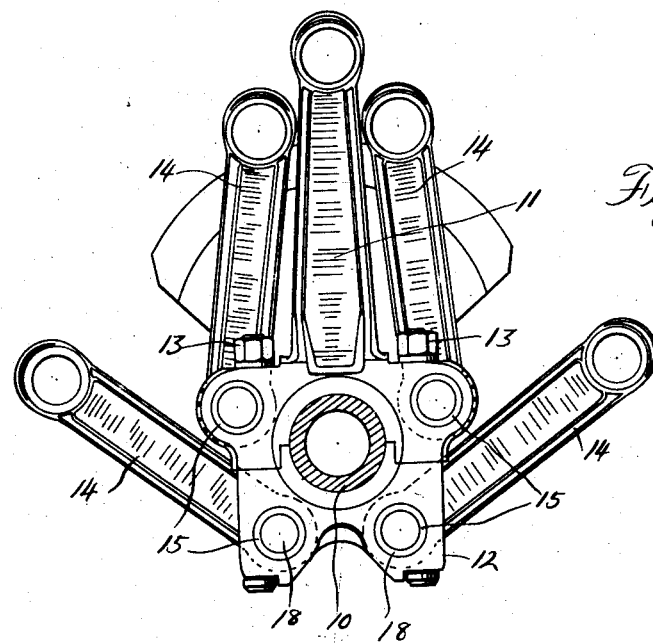
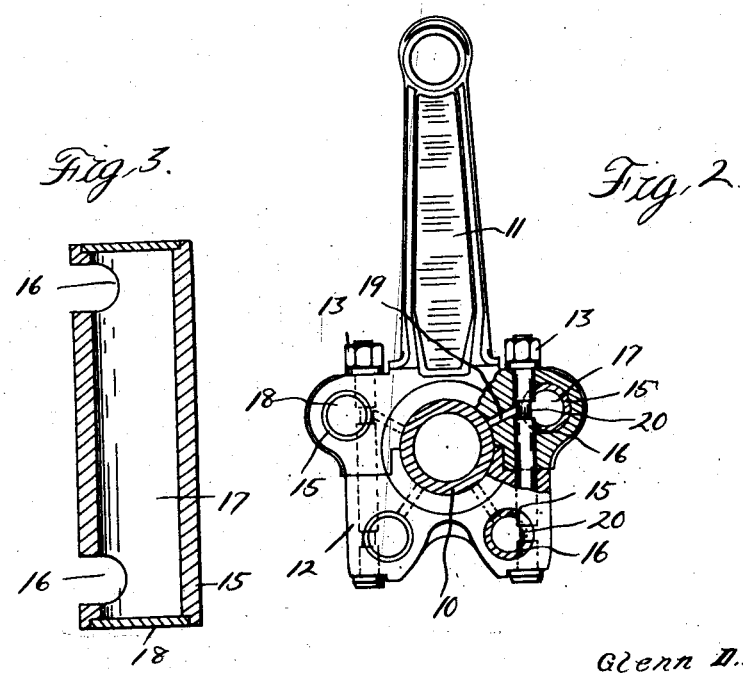
Inventor
Glenn D. Angle
By Whittemore Hulbert Whittemore
& Belknap
Attorneys Patented Aug. 2, 1927.

1,637,979

UNITED STATES PATENT OFFICE.

GLENN D. ANGLE, OF DETROIT, MICHIGAN.

ARTICULATED CONNECTING ROD.

Application filed July 19, 1926. Serial No. 123,550.

This invention relates to articulated connecting rods and more particularly to improvements pertaining to a simplified method of locking the link pins.

While the invention finds particular utility in connection with engines of five cylinders in radial form, and while the illustrative embodiment of the invention herein shown and described is adapted for use in such an engine, nevertheless as this description proceeds it will become immediately apparent to those skilled in this art that in special instances the invention may be used, in whole or in part with engines having a different number of cylinders operating about one crank pin.

The invention deals particularly with a forked master rod and cap held united by a plurality of bolts, for instance four bolts with two arranged on each side. The present invention proposes to utilize these bolts for the purpose of supporting and locking the link pins against endwise and rotative movement. Thus the boss on the lower end of each of the link rods oscillates upon its associated link pin.

In practicing the present invention the bolts are located substantially midway between vertical planes passing through the axes of the link pins and these pins are notched sufficiently to permit the bolts to be assembled. Thus when the bolts are inserted the link pins are prevented from moving endwise or from rotating so that the necessity for the provision of other locking means for the link pins is eliminated. The notching of each of the link pins irrespective of its position in the assembled construction, is the same so that these pins are interchangeable.

The invention also contemplates the provision of means for lubricating the link pins which consists of undercutting the bolts at the point at which they pass through the link pins thereby providing a passage for oil on its way from the crank pin to the hollow interior of the link pins. The ends of the link pins are closed so that oil under pressure can be maintained therein and fed to the bearing of the link rod.

The several objects, advantages and novel details of construction of this invention will be made more apparent as this description proceeds, especially when considered in connection with the accompanying drawing wherein;

Figure 1 is an elevational view of a master rod and its associated link rods constructed in accordance with my invention.

Figure 2 is an elevational view of the master rod, with the link rods removed and certain parts in section and Figure 3 is a sectional view through one of the link pins.

Referring now particularly to the drawing wherein like reference characters indicate like parts the reference character 10 indicates a crank pin upon which the master rod 11 is mounted by means of a cap 12. In the present form of construction the connecting rod 11 and cap 12 are secured together by four bolts 13 arranged with two on each side of the crank pin 10. The reference character 14 indicates a plurality of link rods mounted upon the connecting rod and cap by means of link pins 15.

Inasmuch as the present embodiment of the invention contemplates the use of four bolts 13 each of the link pins 15 is notched or cut away at two points as indicated at 16 to accommodate the bolts 13. It will be noted that the bolts 13 are located substantially midway between vertical planes passing through the axes of the link pins so that when the link pins are inserted with the notches or cut-away portions 16 arranged in coincidence with the axis of the bolt receiving apertures in the master rod and cap, the bolts may be inserted and will engage in these notches 16 to prevent either endwise or rotative movement of the link pins.

Each of the link pins is preferably of a hollow construction to provide a chamber 17 and the ends thereof may be closed by plugs 18 to provide a lubricant receiving chamber in each of the link pins which is fed with lubricant through a passage 19 leading from the crank pin 10. Each bolt 13 is preferably undercut or provided with a reduced portion 20 at the point where it passes through the adjacent link pin thereby providing a passage for the oil so that this oil may flow into the chamber 17.

From the foregoing it will be apparent that the herein described construction eliminates a number of parts since the bolts 13 perform more than their ordinary function.

Obviously the link pins are positively locked in place by the bolts without the necessity of other locking means and furthermore an efficient but simple lubricating system is provided. While the invention has been shown and described in connection with an articulated connecting rod for use with engines of five cylinders in radial form it will be apparent that the invention is broader than this in its scope and may be employed with equal facility in connection with engines having a different number of cylinders operating about one crank pin. Therefore reservation is made to make such changes in the details of construction as may come within the purview of the accompanying claims.

What I claim as my invention is:

1. In an articulated connecting rod system, a connecting rod and cap, a cap securing bolt and a link pin located to one side of the center of said bolt and engaged by the bolt to lock said pin in place.

2. In an articulated connecting rod system, a connecting rod and cap, a cap securing bolt and a notched link pin located at one side of said bolt with the bolt engaging said notch to lock said pin in place.

3. The combination with a connecting rod and cap, of link pins mounted therein and cap securing bolts intersecting said pins and locking the same in place.

4. The combination with a connecting rod and cap, of a notched link pin supported therein and a cap securing bolt engaged in said notch for locking said link pin in place.

5. In an articulated connecting rod system, a master rod and cap, notched link pins supported therein and cap securing bolts engaging said notches for locking said pins against endwise and rotational movement.

6. In an articulated connecting rod system, a master rod and cap, link pins mounted therein and a cap securing bolt located midway between vertical planes passing through the axes of two of said pins and engaging said pins for locking the same in place.

7. In an articulated connecting rod system, a master rod and cap, link pins mounted therein, a cap securing bolt located midway between vertical planes passing through the axis of two of said pins and notches formed in said pins to accommodate said bolt whereby said pins are locked against endwise or rotative movement.

In testimony whereof I affix my signature.

GLENN D. ANGLE.